(12) United States Patent
Morimoto

(10) Patent No.: US 8,743,402 B2
(45) Date of Patent: Jun. 3, 2014

(54) PRINTING SYSTEM FOR SELECTING A PRINTER AND OPERATOR, AND RECORDING MEDIUM

(75) Inventor: Tsuyoshi Morimoto, Tachikawa (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 33 days.

(21) Appl. No.: 13/415,023

(22) Filed: Mar. 8, 2012

(65) Prior Publication Data

US 2012/0236360 A1 Sep. 20, 2012

(30) Foreign Application Priority Data

Mar. 15, 2011 (JP) ................................. 2011-056496

(51) Int. Cl.
*G06F 3/12* (2006.01)
*G06Q 10/00* (2012.01)

(52) U.S. Cl.
USPC .......................... 358/1.15; 358/1.13; 705/7.13

(58) Field of Classification Search
CPC ..... G06F 3/1211; G06F 3/126; G06F 3/1273; G06F 3/1285
USPC ............................................... 358/1.15, 1.13
See application file for complete search history.

(56) References Cited

U.S. PATENT DOCUMENTS

| | | | |
|---|---|---|---|
| 6,407,820 B1 * | 6/2002 | Hansen et al. ................ | 358/1.12 |
| 2001/0043346 A1 * | 11/2001 | Roztocil et al. ................. | 358/1.9 |
| 2004/0225552 A1 * | 11/2004 | Ikeda et al. ........................ | 705/9 |
| 2006/0012825 A1 * | 1/2006 | Kadowaki ..................... | 358/1.15 |
| 2006/0044585 A1 * | 3/2006 | Kaneko ......................... | 358/1.13 |
| 2006/0187484 A1 * | 8/2006 | Noda ............................ | 358/1.15 |
| 2006/0232818 A1 * | 10/2006 | Hino et al. .................... | 358/1.15 |
| 2007/0236725 A1 * | 10/2007 | Harmon et al. ............... | 358/1.15 |
| 2007/0253029 A1 * | 11/2007 | Yamaguchi ................... | 358/1.18 |
| 2008/0109270 A1 * | 5/2008 | Shepherd et al. ................. | 705/7 |
| 2008/0115207 A1 * | 5/2008 | Go .................................. | 726/17 |
| 2009/0174895 A1 * | 7/2009 | Huster .......................... | 358/1.15 |

(Continued)

FOREIGN PATENT DOCUMENTS

| | | |
|---|---|---|
| JP | 11-288344 A | 10/1999 |
| JP | 2006-65806 A | 3/2006 |
| JP | 2006-301742 A | 11/2006 |

OTHER PUBLICATIONS

Japanese Office Action (Notice of Reasons for Refusal) dated May 21, 2013, issued by the Japanese Patent Office in corresponding Japanese Application No. 2011-056496, and an English translation of the Office Action. (8 pgs.).

(Continued)

*Primary Examiner* — Houshang Safaipour
*Assistant Examiner* — Walter Yehl
(74) *Attorney, Agent, or Firm* — Buchanan Ingersoll & Rooney PC

(57) ABSTRACT

A printing system comprises a storage part for storing therein first history information on the number of responsible printing operations of each operator by orderer and second history information on the number of uses of each printer by operator, and a determination part for determining a responsible operator to be in charge of printing of a new print order from a specific orderer and a processing printer to be used by the responsible operator in the printing of the new print order on the basis of the first history information and the second history information.

8 Claims, 13 Drawing Sheets

DB3a
<FOR ORDERER UA>

| MONOCHROME PRINTING | | COLOR PRINTING | | | |
|---|---|---|---|---|---|
| COMBINATION CB | EVALUATION INDEX EB | | COMBINATION CB | EVALUATION INDEX EB | |
| CB11 | YAMADA, No. 1 | EB11 | 200 | CB21 | YAMADA, No. 3 | EB21 | 100 |
| CB12 | YAMADA, No. 2 | EB12 | 195 | CB22 | YAMADA, No. 4 | EB22 | 200 |
| CB13 | SATO, No. 1 | EB13 | 55 | CB23 | SATO, No. 3 | EB23 | 0 |
| CB14 | SATO, No. 2 | EB14 | 65 | CB24 | SATO, No. 4 | EB24 | 0 |
| CB15 | YOSHIDA, No. 1 | EB15 | 140 | CB25 | YOSHIDA, No. 3 | EB25 | 2 |
| CB16 | YOSHIDA, No. 2 | EB16 | 160 | CB26 | YOSHIDA, No. 4 | EB26 | 5 |
| CB17 | KIMURA, No. 1 | EB17 | 70 | CB27 | KIMURA, No. 3 | EB27 | 0 |
| CB18 | KIMURA, No. 2 | EB18 | 100 | CB28 | KIMURA, No. 4 | EB28 | 0 |

(56) References Cited

U.S. PATENT DOCUMENTS

2009/0204470 A1* 8/2009 Weyl et al. ............... 705/9
2009/0268230 A1* 10/2009 Rai ........................ 358/1.15
2009/0281866 A1* 11/2009 Morimoto ................ 705/9
2010/0182645 A1* 7/2010 Miyata .................... 358/1.15
2010/0253979 A1 10/2010 Hino et al.
2011/0134466 A1* 6/2011 Nakagawa ............... 358/1.15
2012/0029963 A1* 2/2012 Olding et al. ............ 705/7.14
2013/0148156 A1* 6/2013 Teraue .................... 358/1.15

OTHER PUBLICATIONS

Office Action issued in corresponding Chinese Patent Application No. 201210061254.5, dated Feb. 25, 2014, and English Translation thereof.

* cited by examiner

*Fig.3*

<RESPONSIBLE HISTORY DATABASE>

| | MONOCHROME PRINT SETTING | | | | COLOR PRINT SETTING | | | |
|---|---|---|---|---|---|---|---|---|
| | YAMADA | SATO | YOSHIDA | KIMURA | YAMADA | SATO | YOSHIDA | KIMURA |
| ORDERER UA | 100 | 5 | 60 | 50 | 50 | 0 | 0 | 0 |
| ORDERER UB | 50 | 10 | 10 | 5 | 50 | 0 | 2 | 0 |
| ORDERER UC | 45 | 95 | 110 | 5 | 100 | 0 | 5 | 0 |

<USAGE HISTORY DATABASE>

|  | MONOCHROME ||  COLOR ||
|---|---|---|---|---|
|  | No. 1 | No. 2 | No. 3 | No. 4 |
| YAMADA | 100 | 95 | 50 | 150 |
| SATO | 50 | 60 | 0 | 0 |
| YOSHIDA | 80 | 100 | 2 | 5 |
| KIMURA | 20 | 40 | 0 | 0 |

Fig.5

DB3a  <FOR ORDERER UA>

| MONOCHROME PRINTING | | | | COLOR PRINTING | | | |
|---|---|---|---|---|---|---|---|
| COMBINATION CB | | EVALUATION INDEX EB | | COMBINATION CB | | EVALUATION INDEX EB | |
| CB11 | YAMADA, No. 1 | EB11 | 200 | CB21 | YAMADA, No. 3 | EB21 | 100 |
| CB12 | YAMADA, No. 2 | EB12 | 195 | CB22 | YAMADA, No. 4 | EB22 | 200 |
| CB13 | SATO, No. 1 | EB13 | 55 | CB23 | SATO, No. 3 | EB23 | 0 |
| CB14 | SATO, No. 2 | EB14 | 65 | CB24 | SATO, No. 4 | EB24 | 0 |
| CB15 | YOSHIDA, No. 1 | EB15 | 140 | CB25 | YOSHIDA, No. 3 | EB25 | 2 |
| CB16 | YOSHIDA, No. 2 | EB16 | 160 | CB26 | YOSHIDA, No. 4 | EB26 | 5 |
| CB17 | KIMURA, No. 1 | EB17 | 70 | CB27 | KIMURA, No. 3 | EB27 | 0 |
| CB18 | KIMURA, No. 2 | EB18 | 100 | CB28 | KIMURA, No. 4 | EB28 | 0 |

Fig.6

DB3b  <FOR ORDERER UB>

| MONOCHROME PRINTING | | | | COLOR PRINTING | | | |
|---|---|---|---|---|---|---|---|
| COMBINATION CB | | EVALUATION INDEX EB | | COMBINATION CB | | EVALUATION INDEX EB | |
| CB11 | YAMADA, No. 1 | EB11 | 150 | CB21 | YAMADA, No. 3 | EB21 | 100 |
| CB12 | YAMADA, No. 2 | EB12 | 145 | CB22 | YAMADA, No. 4 | EB22 | 200 |
| CB13 | SATO, No. 1 | EB13 | 60 | CB23 | SATO, No. 3 | EB23 | 0 |
| CB14 | SATO, No. 2 | EB14 | 70 | CB24 | SATO, No. 4 | EB24 | 0 |
| CB15 | YOSHIDA, No. 1 | EB15 | 90 | CB25 | YOSHIDA, No. 3 | EB25 | 4 |
| CB16 | YOSHIDA, No. 2 | EB16 | 110 | CB26 | YOSHIDA, No. 4 | EB26 | 7 |
| CB17 | KIMURA, No. 1 | EB17 | 25 | CB27 | KIMURA, No. 3 | EB27 | 0 |
| CB18 | KIMURA, No. 2 | EB18 | 45 | CB28 | KIMURA, No. 4 | EB28 | 0 |

Fig. 7

DB3c  <FOR ORDERER UC>

| MONOCHROME PRINTING | | | | COLOR PRINTING | | | |
|---|---|---|---|---|---|---|---|
| COMBINATION CB | | EVALUATION INDEX EB | | COMBINATION CB | | EVALUATION INDEX EB | |
| CB11 | YAMADA, No. 1 | EB11 | 145 | CB21 | YAMADA, No. 3 | EB21 | 150 |
| CB12 | YAMADA, No. 2 | EB12 | 140 | CB22 | YAMADA, No. 4 | EB22 | 250 |
| CB13 | SATO, No. 1 | EB13 | 145 | CB23 | SATO, No. 3 | EB23 | 0 |
| CB14 | SATO, No. 2 | EB14 | 155 | CB24 | SATO, No. 4 | EB24 | 0 |
| CB15 | YOSHIDA, No. 1 | EB15 | 190 | CB25 | YOSHIDA, No. 3 | EB25 | 7 |
| CB16 | YOSHIDA, No. 2 | EB16 | 210 | CB26 | YOSHIDA, No. 4 | EB26 | 10 |
| CB17 | KIMURA, No. 1 | EB17 | 25 | CB27 | KIMURA, No. 3 | EB27 | 0 |
| CB18 | KIMURA, No. 2 | EB18 | 45 | CB28 | KIMURA, No. 4 | EB28 | 0 |

| JOB ID | RESPONSIBLE OPERATOR | PROCESSING PRINTER | DEADLINE | NUMBER OF DAYS LEFT | EXPECTED WORKING TIME | EXPECTED PROCESSING TIME | EXPECTED WORKING TIME PER DAY | EXPECTED PROCESSING TIME PER DAY |
|---|---|---|---|---|---|---|---|---|
| 101 | YAMADA | No. 1 | JULY 22 | 3 DAYS | 210 MINS | 120 MINS | 70 MINS | 40 MINS |
| 102 | YAMADA | No. 4 | JULY 20 | 1 DAY | 30 MINS | 20 MINS | 30 MINS | 20 MINS |
| 103 | YAMADA | No. 1 | JULY 24 | 5 DAYS | 600 MINS | 750 MINS | 120 MINS | 150 MINS |
| 104 | YAMADA | No. 4 | JULY 21 | 2 DAYS | 600 MINS | 750 MINS | 300 MINS | 375 MINS |

Fig.13

| JOB ID / DATE | 101 | 102 | 103 | 104 |
|---|---|---|---|---|
| JULY 20 | 70 MINS | 30 MINS | 120 MINS | 300 MINS |
| JULY 21 | 70 MINS | | 120 MINS | 300 MINS |
| JULY 22 | 70 MINS | | 120 MINS | |
| JULY 23 | | | 120 MINS | |
| JULY 24 | | | 120 MINS | |

Fig.14

| JOB ID / DATE | 101 | 103 |
|---|---|---|
| JULY 20 | 40 MINS | 150 MINS |
| JULY 21 | 40 MINS | 150 MINS |
| JULY 22 | 40 MINS | 150 MINS |
| JULY 23 | | 150 MINS |
| JULY 24 | | 150 MINS |

PRINTING SYSTEM FOR SELECTING A PRINTER AND OPERATOR, AND RECORDING MEDIUM

This application is based on Japanese Patent Application No. 2011-056496 filed on Mar. 15, 2011, the contents of which are hereby incorporated by reference.

BACKGROUND OF THE INVENTION

1. Field of the Invention

The present invention relates to a printing system and a technique relevant to the same.

2. Description of the Background Art

In some of printing systems which perform printing on the basis of a print order from an orderer, a printing apparatus is operated by a plurality of operators. In such a printing system, a responsible operator to be in charge of a new print order is determined in consideration of the skill of each operator. Japanese Patent Application Laid Open Gazette No. 2006-301742 (Patent document 1), for example, discloses a printing system which assigns a new specific job to a highly skilled operator on the basis of a skill table for storing therein the skill of each operator for a specific job (work).

The "skill" of each operator, however, is determined on the basis of an evaluation criterion of a printing company, not determined on the basis of an evaluation (the level of satisfaction and the like) of an orderer who is a customer. Since the preference of a customer is basically alien to the skill of an operator, the orderer does not always satisfy a work result (color, hue, and the like) of a "highly" skilled operator (who is determined to be "highly skilled" on the basis of the company standard). There are some cases, for example, where the preference of an orderer for a printed matter does not conform to the hue (color) of a printed matter (work result) made by a highly skilled operator but conforms to the hue (color) of a printed matter (work result) made by a low skilled operator. In other words, it sometimes turns out that an orderer prefers the hue (color) of a printed matter (work result) made by a low skilled operator to the hue (color) of a printed matter (work result) made by a highly skilled operator.

In the above-discussed printing system, however, since a responsible operator to be in charge of a new print order is uniquely determined on the basis of the skill of each operator, it is difficult to reflect the preference of an orderer for the work result of each operator on the determination of the responsible operator.

SUMMARY OF THE INVENTION

It is an object of the present invention to provide a technique which allows the preference of an orderer for a work result of each operator to be reflected on determination of a responsible operator to be in charge of a new print order.

The present invention is intended for a printing system. According to a first aspect of the present invention, the printing system comprises a storage part for storing therein first history information on the number of responsible printing operations of each operator by orderer and second history information on the number of uses of each printer by operator, and a determination part for determining a responsible operator to be in charge of printing of a new print order from a specific orderer and a processing printer to be used by the responsible operator in the printing of the new print order on the basis of the first history information and the second history information.

The present invention is also intended for a non-transitory computer-readable recording medium. According to a second aspect of the present invention, the non-transitory computer-readable recording medium records therein a computer program for causing a computer to serve as a device comprising a storage part for storing therein first history information on the number of responsible printing operations of each operator by orderer and second history information on the number of uses of each printer by operator, and a determination part for determining a responsible operator to be in charge of printing of a new print order from a specific orderer and a processing printer to be used by the responsible operator in the printing of the new print order on the basis of the first history information and the second history information.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a view showing a responsible history database;

FIG. 4 is a view showing a usage history database;

FIG. 5 is a view showing an evaluation index database;

FIG. 6 is a view showing another evaluation index database;

FIG. 7 is a view showing still another evaluation index database;

FIG. 11 is a view showing a job management database;

FIG. 13 is a schedule table of an operator; and

FIG. 14 is a schedule table of a printer.

DESCRIPTION OF THE PREFERRED EMBODIMENTS

Hereinafter, the preferred embodiments of the present invention will be discussed with reference to the accompanying drawings.

1. The First Preferred Embodiment

<System Configuration>

Figure 1:
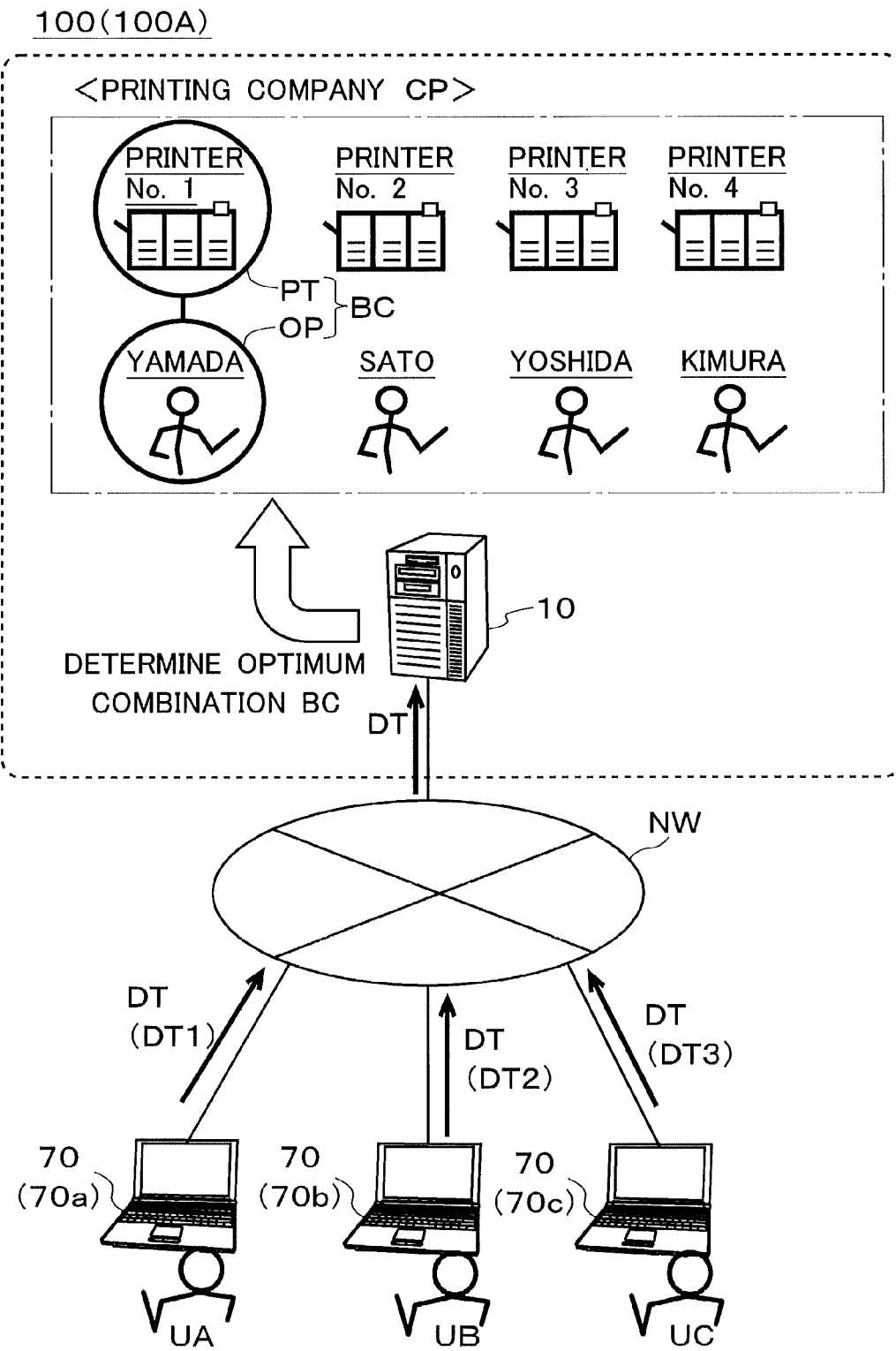
FIG. 1 is a view showing an overall configuration of a printing system in accordance with a first preferred embodiment of the present invention.

FIG. 1 is a schematic view showing a printing system 100 (also referred to as 100A) in accordance with the first preferred embodiment of the present invention. As shown in FIG. 1, the printing system 100 comprises a server 10 and orderer terminals 70 (70a, 70b, and 70c). In the printing system 100A, an orderer (customer) orders a printing company CP to perform a printing operation (printing job) by using the orderer terminal 70. Then, the server 10 in the printing company CP receives the order of printing operation from the orderer terminal 70. For this reason, the printing system 100A is also referred to as a printing order system or a printing job order system in which printing operations are ordered and received.

The server 10 and each of the orderer terminals 70 (70a, 70b, and 70c) are connected to each other via a network NW and can perform network communication therebetween. The network NW includes a LAN, a WAN, the Internet, and the like. The connection between each of the devices and the network NW may be wired or wireless.

The orderer terminals 70a, 70b, and 70c are used by orderers UA, UB, and UC, respectively. As each of the orderer terminals 70, for example, a personal computer may be used. The orderer terminals 70a, 70b, and 70c send print order data DT1, DT2, and DT3 on print orders to the server 10 via the network NW on the basis of inputs from the orderers UA, UB, and UC, respectively. The orderers UA, UB, and UC can thereby send the print order data DT1, DT2, and DT3 to the server 10 by using the orderer terminals 70a, 70b, and 70c which the orderers UA, UB, and UC have, respectively.

The print order data DT (DT1, DT2, and DT3) includes various information on the print order. Specifically, the print order data DT includes "orderer information", "print number information", "deadline information", "print setting information", and the like. The "orderer information" is a piece of information indicating an orderer of the print order. The "print number information" is a piece of information indicating the number of sheets to be printed for the print order. The "deadline information" is a piece of information indicating a deadline of the print order. The "print setting information" is a piece of information including data for distinguishing between monochrome printing and color printing.

The server 10 is a device for managing the print orders from the orderers UA, UB and UC. Specifically, the server 10 determines an optimum combination (best combination) BC of a responsible operator OP to be in charge of printing of a new print order ND and a processing printer PT to be used by the responsible operator OP in the printing of the new print order ND.

It is herein assumed that there are four operators ("Yamada", "Sato", "Yoshida", and "Kimura") and four printers (printing apparatuses) ("No. 1", "No. 2", "No. 3" and "No. 4") in the printing company CP. Two ("No. 1" and "No. 2") of the four printers are used to perform printing of a print order on a monochrome print setting and the other two printers ("No. 3" and "No. 4") are used to perform printing of a print order on a color print setting.

Figure 2:
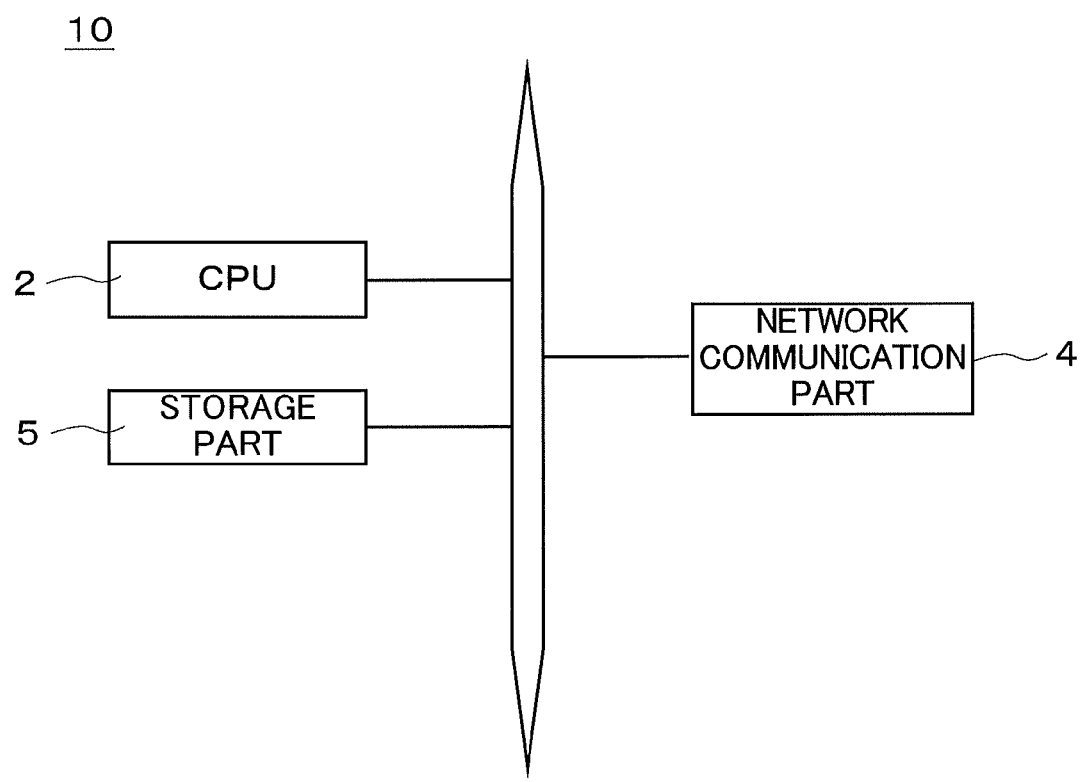
FIG. 2 is a view showing a hardware structure of a server.

FIG. 2 is a view showing a hardware structure of the server 10.

As shown in FIG. 2, the server 10 comprises a CPU 2, a network communication part 4, a storage part 5 (a semiconductor memory, a hard disk drive (HDD), or the like), and the like. The server 10 executes various programs PG by using the CPU 2 or the like, to thereby implement a variety of functions. The various programs PG are recorded in various portable recording media (in other words, various non-transitory computer-readable recording media) such as a CD-ROM, a DVD-ROM, a USB memory, and the like and installed in the server 10 via the recording media.

In the storage part 5, stored are a plurality of databases DB which determine various information on the print order. Specifically, in the storage part 5, stored are a responsible history database DB1 (see FIG. 3), a usage history database DB2 (see FIG. 4), and a plurality of evaluation index databases DB3a (see FIG. 5), DB3b (see FIG. 6), and DB3c (see FIG. 7) for the respective orderers.

As shown in FIG. 3, the responsible history database DB1 determines history information HM1 on the number of responsible printing operations (in detail, the number of responsible printing operations within a predetermined period, and in other words, the frequency of responsible printing operations) of each operator by orderer. Specifically, the responsible history database DB1 determines the number of responsible printing operations during the last fiscal year (hereinafter, also referred to as the "number of last-fiscal-year responsible printing operations") on print orders from each orderer by operator. Further, in the responsible history database DB1, the number of responsible printing operations on the monochrome print setting and the number of responsible printing operations on the color print setting are separately recorded.

On the first line of the responsible history database DB1, recorded are "100", "5", "60", and "50" as the respective numbers of responsible printing operations of the operators ("Yamada", "Sato", "Yoshida", and "Kimura") on the print orders of the "monochrome print setting" from the orderer UA. Further, "5", "0", "0", and "0" are recorded as the respective numbers of responsible printing operations of the operators ("Yamada", "Sato", "Yoshida", and "Kimura") on the print orders of the "color print setting" from the orderer UA.

Similarly, on the second line of the responsible history database DB1, the respective numbers of responsible printing operations by operator on the print orders of the "monochrome print setting" from the orderer UB are recorded and the respective numbers of responsible printing operations by operator on the print orders of the "color print setting" from the orderer UB are also recorded. Further, on the third line of the responsible history database DB1, the respective numbers of responsible printing operations by operator on the print orders of the "monochrome print setting" from the orderer UC are recorded and the respective numbers of responsible printing operations by operator on the print orders of the "color print setting" from the orderer UC are also recorded.

In this database, only the print orders which are determined to satisfy the orderer on the basis of the criterion for determining whether or not the orderer satisfies the quality of a product (printed matter) which has been ordered are counted as the number of responsible printing operations. In the first preferred embodiment, the above criterion is whether or not the product has been returned from the orderer. Specifically, when the product is returned from the orderer, it is determined that the orderer does not satisfy the quality of the product, and when the product is not returned from the orderer, it is determined that the orderer satisfies the quality of the product. Therefore, the number of responsible printing operations more exactly reflects whether or not the orderer satisfies.

As shown in FIG. 4, the usage history database DB2 determines history information HM2 on the number of uses of each printer. Specifically, the usage history database DB2 determines the number of uses by each operator during the last fiscal year (hereinafter, also referred to as the "number of last-fiscal-year uses") by printer. The number of last-fiscal-year uses is not only the number of uses on print orders from a specific orderer, but the number of uses on print orders from all of the orderers UA, UB, and UC.

Specifically, on the first line of the usage history database DB2, recorded are "100", "95", "50", and "150" as the respective numbers of uses of the printers ("No. 1", "No. 2", "No. 3" and "No. 4") by the operator "Yamada".

Similarly, on the second line of the usage history database DB2, recorded are the respective numbers of uses of the printers by the operator "Sato". Further, on the third line of the usage history database DB2, recorded are the respective numbers of uses of the printers by the operator "Yoshida" and on the fourth line of the usage history database DB2, recorded are the respective numbers of uses of the printers by the operator "Kimura".

The evaluation index databases DB3a, DB3b, and DB3c determine evaluation indices EB of the orderers (UA, UB, and UC), respectively, on a plurality of combinations CB each consisting of an operator and a printer on the basis of the history information HM1 and the history information HM2 (see FIGS. 5 to 7).

As shown in FIG. 5, the evaluation index database DB3a determines the evaluation indices EB on a plurality of combinations CB for the orderer UA.

Specifically, as shown in the left half of FIG. 5, the evaluation index database DB3a determines evaluation indices EB11 to EB18 (for the orderer UA) on a plurality of combinations CB11 to CB18 of a plurality of operators ("Yamada", "Sato", "Yoshida", and "Kimura") and the two printers ("No. 1" and "No. 2") performing monochrome printing.

Further, as shown in the right half of FIG. 5, the evaluation index database DB3a also determines evaluation indices EB21 to EB28 (for the orderer UA) on a plurality of combinations CB21 to CB28 of a plurality of operators ("Yamada", "Sato", "Yoshida", and "Kimura") and the two printers ("No. 3" and "No. 4") performing color printing.

A value of each evaluation index EB is calculated on the basis of the history information HM1 recorded in the responsible history database DB1 (see FIG. 3) and the history information HM2 recorded in the usage history database DB2 (see FIG. 4).

As the evaluation index EB11 on the combination CB11 ("Yamada", "No. 1") in FIG. 5, for example, "200" is recorded. The value (200) of the evaluation index EB11 is the sum of the number of responsible printing operations (100) of the operator "Yamada" on the print orders of monochrome print setting from the orderer UA (see FIG. 3) and the number of uses (100) of the printer "No. 1" by the operator "Yamada" (see FIG. 4). Further, as the evaluation index EB21 on the combination CB21 ("Yamada", "No. 3"), "100" is recorded. The value (100) of the evaluation index EB21 is the sum of the number of responsible printing operations (50) of the operator "Yamada" on the print orders of color print setting from the orderer UA (see FIG. 3) and the number of uses (50) of the printer "No. 3" by the operator "Yamada" (see FIG. 4).

Similarly, the evaluation index database DB3b shown in FIG. 6 determines the evaluation indices EB on a plurality of combinations CB for the orderer UB, and the evaluation index database DB3c shown in FIG. 7 determines the evaluation indices EB on a plurality of combinations CB for the orderer UC.

Figure 8:
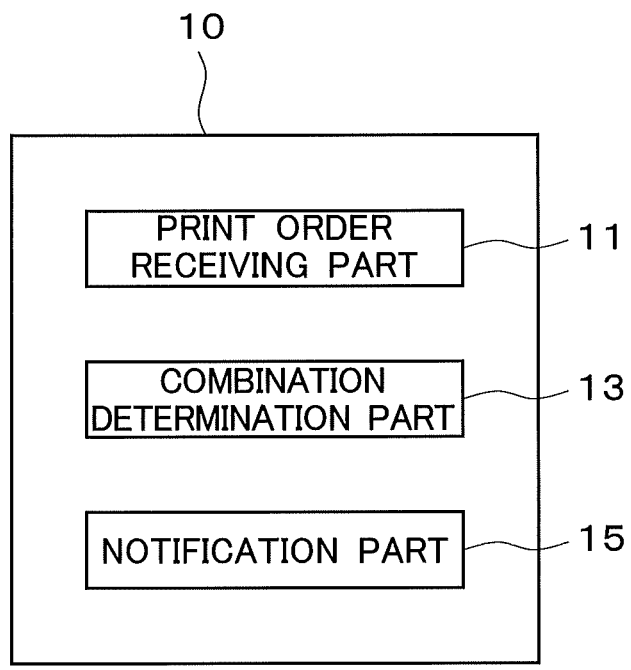
FIG. 8 is a view showing a functional constitution of the server.

FIG. 8 is a block diagram showing a functional constitution of the server 10. As shown in FIG. 8, the server 10 has a print order receiving part 11, a combination determination part 13, a notification part 15, and the like. The server 10 executes predetermined programs PG, to thereby implement these processing parts.

The print order receiving part 11 is a processing part for receiving a print order from an orderer on the basis of print order data DT received from the orderer terminal 70.

The combination determination part 13 is a processing part for determining a responsible operator OP to be in charge of printing of a new print order ND and a processing printer PT to be used by the responsible operator OP in the printing of the new print order ND on the basis of the evaluation index database DB3. Specifically, the combination determination part 13 determines the responsible operator OP and the processing printer PT on the basis of the history information HM1 and the history information HM2.

The notification part 15 is a processing part for notifying the responsible operator OP that the new print order ND is assigned to the responsible operator OP and of the processing printer PT to be used in the printing of the new print order ND.

<Operation>

Hereinafter, discussion will be made on an overall operation of the first preferred embodiment, with reference to FIG. 1.

As shown in FIG. 1, first, the server 10 in the printing company CP receives print order data DT (DT1, DT2, or DT3) from the orderer terminal 70 (70a, 70b, or 70c) which is an orderer of a print order via the network NW. After the server 10 receives the print order data DT, the server 10 determines an optimum combination BC (for example, the combination of "Yamada" and "No. 1") of a responsible operator OP to be in charge of printing of a new print order ND and a processing printer PT to be used by the responsible operator OP in the printing of the new print order ND.

Figure 9:
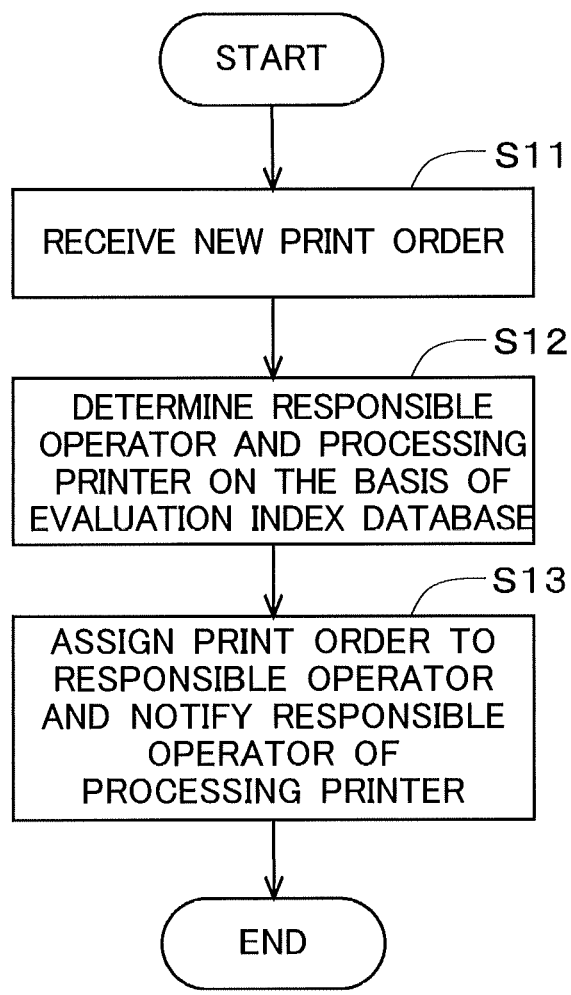
FIG. 9 is a flowchart showing an operation in accordance with the first preferred embodiment.

FIG. 9 is a flowchart showing an operation of the server 10 in accordance with the first preferred embodiment. Hereinafter, discussion will be made, with reference to FIG. 9, on a case where (1) a process of receiving an order, (2) a process of determining an optimum combination BC, and (3) an assigning process are sequentially performed.

(1) In Step S11, the server 10 receives a new print order ND on the basis of various information included in print order data DT. Specifically, the print order receiving part 11 receives the print order data DT (DT1, DT2, or DT3) from the orderer terminal 70 (70a, 70b, or 70c) via the network NW. Further, the print order receiving part 11 checks an orderer (UA, UB, and UC) of the new print order ND on the basis of the "orderer information" and checks a print setting ("monochrome printing" or "color printing") of the new print order ND on the basis of the "print setting information".

(2) In the next Step S12, the combination determination part 13 determines a responsible operator OP to be in charge of printing of the new print order ND and a processing printer PT to be used by the responsible operator OP in the printing of the new print order ND.

Specifically, the combination determination part 13 determines one of a plurality of combinations CB for the orderer of the new print order ND, which has the highest evaluation index EB, as the optimum combination BC on the basis of the evaluation index database DB3 in the storage part 5. Then, the combination determination part 13 determines an operator of the optimum combination BC as the responsible operator OP and determines a printer of the optimum combination BC as the processing printer PT.

When a new print order ND on the monochrome print setting is received from the orderer UA, for example, the combination determination part 13 determines the optimum combination BC on the basis of the evaluation index database DB3a determining the evaluation indices EB for the orderer UA (see FIG. 5). Specifically, the combination determination part 13 determines the combination CB11 ("Yamada", "No. 1") corresponding to the highest evaluation index EB11 (200) as the optimum combination BC, out of the plurality of combinations CB11 to CB18 for the orderer UA. When a new print order ND on the color print setting is received from the orderer UA, the combination determination part 13 determines the combination CB22 ("Yamada", "No. 4") corresponding to the highest evaluation index EB22 (200) as the optimum combination BC, out of the plurality of combinations CB21 to CB28.

Further, when a new print order ND on the monochrome print setting is received from the orderer UB, the combination determination part 13 determines the optimum combination BC on the basis of the evaluation index database DB3b determining the evaluation indices EB for the orderer UB (see FIG.

6). Specifically, the combination determination part 13 determines the combination CB11 ("Yamada", "No. 1") corresponding to the highest evaluation index EB11 (150) as the optimum combination BC, out of the plurality of combinations CB11 to CB18 for the orderer UB. When a new print order ND on the color print setting is received from the orderer UB, the combination determination part 13 determines the combination CB22 ("Yamada", "No. 4") corresponding to the highest evaluation index EB22 (200) as the optimum combination BC, out of the plurality of combinations CB21 to CB28.

Furthermore, when a new print order ND on the monochrome print setting is received from the orderer UC, the combination determination part 13 determines the optimum combination BC on the basis of the evaluation index database DB3c determining the evaluation indices EB for the orderer UC (see FIG. 7). Specifically, the combination determination part 13 determines the combination CB16 ("Yoshida", "No. 2") corresponding to the highest evaluation index EB16 (210) as the optimum combination BC, out of the plurality of combinations CB11 to CB18 for the orderer UC. When a new print order ND on the color print setting is received from the orderer UC, the combination determination part 13 determines the combination CB22 ("Yamada", "No. 4") corresponding to the highest evaluation index EB22 (250) as the optimum combination BC, out of the plurality of combinations CB21 to CB28.

Then, the operator of the optimum combination BC is determined as the responsible operator OP and the printer of the optimum combination BC is determined as the processing printer PT.

(3) In the next Step S13, the notification part 15 notifies the responsible operator OP (for example, "Yamada") that the new print order ND is assigned to the responsible operator OP and of the processing printer PT (for example "No. 1") to be used in the printing of the new print order ND. The notification is performed by using, e.g., E-mail.

In the above operation, on the basis of the evaluation index database DB3, one of a plurality of combinations CB which has the highest evaluation index EB is determined as the optimum combination BC.

Since the evaluation index database DB3 includes the history information HM1 on the number of responsible printing operations (track record) of each operator by orderer, an operator who has many track records for an orderer is more likely to be selected as a responsible operator. Further, it can be thought that the orderer mostly satisfies the work result (the quality of the printed matter) of the operator who has relatively many track records for the orders from the orderer. In other words, in many cases, the orderer and the operator who has many track records for the orders from the orderer have good chemistry.

Therefore, in the above-discussed operation of the first preferred embodiment, it is possible to consider the chemistry between the orderer of the new print order ND and the operator in determining the responsible operator OP. In other words, in determining the responsible operator OP to be in charge of the printing of the new print order ND, it is possible to reflect the preference of each orderer for the work result (the quality of the printed matter) of each operator.

Further, since the evaluation index database DB3 includes the history information HM2 on the number of uses (track record of use) of each printer by each operator, it is possible to consider the level of proficiency of the responsible operator OP for each printer in determining the processing printer PT to be used by the responsible operator OP. In other words, it is possible to select a printer with which the responsible operator OP is familiar, as the processing printer PT.

Though the case where only the print orders which are determined to satisfy the orderer on the basis of the criterion for determining whether or not the orderer satisfies the quality of a product (printed matter) which has been ordered are counted as the "number of responsible printing operations" (the history information HM1) has been discussed in the above-discussed preferred embodiment, this is only one exemplary case. For example, the print orders may be counted as the "number of responsible printing operations" regardless of whether or not the products are returned from the orderer. In other words, the "number of responsible printing operations" may be simply the number of responsible printing operations. Also in this case, with consideration given to the track records of each operator during a predetermined period (preferably, a longer period (e.g., half a year or more), it is possible to consider the chemistry between the orderer and the operator. In other words, it is possible to reflect the preference of the orderer for the work result of each operator.

In order to make the history information HM1 more beneficial, however, it is preferable that only the print orders which are determined to satisfy the orderer on the basis of a predetermined criterion should be counted as the "number of responsible printing operations" in the history information HM1, like in the above-discussed preferred embodiment. In other words, it is preferable that the print orders except the print orders which do not satisfy the orderer should be counted as the "number of responsible printing operations".

2. The Second Preferred Embodiment

The second preferred embodiment is a variation of the first preferred embodiment.

In the second preferred embodiment, discussion will be an exemplary case where a responsible operator OP to be in charge of a new print order ND and a processing printer PT to be used therefor are separately determined. Specifically, discussion will be a case where the responsible operator OP is first determined on the basis of the responsible history database DB1 (see FIG. 3) and then the processing printer PT is determined on the basis of the usage history database DB2 (see FIG. 4).

<System Configuration>

Figure 10:
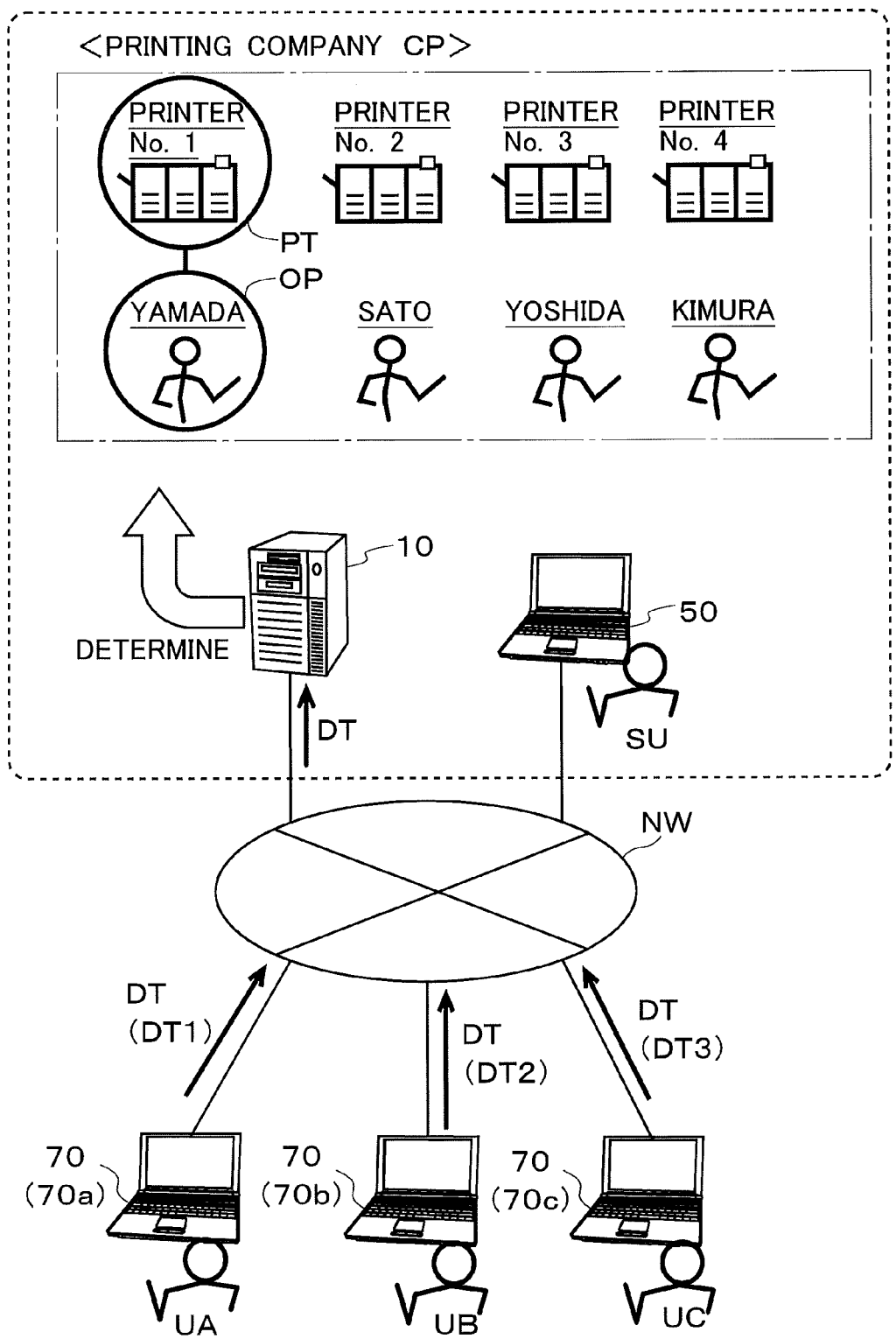
FIG. 10 is a view showing an overall configuration of a printing system in accordance with a second preferred embodiment of the present invention.

FIG. 10 is a schematic view showing a printing system 100 (also referred to as 100B) in accordance with the second preferred embodiment of the present invention. As shown in FIG. 10, the printing system 100B comprises the server 10, the orderer terminals 70 (70a, 70b, and 70c), and an administrator terminal 50.

The administrator terminal 50 is a terminal device used by an administrator SU of the printing system 100B. As the administrator terminal 50, for example, a personal computer or the like may be used.

In the storage part 5, a job management database TB1 shown in FIG. 11 is further stored as well as the responsible history database DB1 (see FIG. 3) and the usage history database DB2 (see FIG. 4).

In the job management database TB1, recorded are various information on print orders which have been received. Specifically, as shown in FIG. 11, recorded are the "Job ID", the "Responsible Operator", the "Processing Printer", the "Deadline", the "Number of Days Left", the "Expected Working Time", the "Expected Processing Time", the "Expected Working Time Per Day", and the "Expected Processing Time Per Day" on each print order.

As the "Job ID", the ID number for identifying a print order is recorded.

As the "Responsible Operator", a responsible operator OP to be in charge of printing of the print order is recorded.

As the "Processing Printer", a processing printer PT to be used by the responsible operator OP is recorded.

As the "Deadline", the date of deadline of the print order is recorded.

As the "Number of Days Left", the number of days left till the deadline of the print order is recorded.

As the "Expected Working Time", time required of the responsible operator OP to perform various works for the print order is recorded. Specifically, as the "Expected Working Time", recorded is the total time of the time required to perform printing of the print order by using the processing printer PT and the time required to perform works (various settings of the processing printer PT and the like) other than the printing. As the "Expected Working Time", time expected by the responsible operator OP is inputted by the responsible operator OP. Specifically, when the print order is assigned to the responsible operator OP, the responsible operator OP expects time required to perform works on the print order on the basis of the number of sheets to be printed and the like for the print order. After that, the responsible operator OP inputs the expected time as the "Expected Working Time" through a predetermined input device (not shown).

As the "Expected Processing Time", time required of the processing printer PT to perform the printing of the print order is recorded. The expected processing time is calculated by the server 10 at the point in time when the print order is assigned. Specifically, the server 10 calculates the expected processing time by using two values, i.e., the printing performance (time required for printing per sheet) of the processing printer PT which is recorded in the storage part 5 and the number of sheets to be printed for the assigned print order. It is assumed, for example, that the time required for printing per sheet is "0.5 minutes per sheet" and the number of sheets to be printed for the print order is "240". In this case, the server 10 calculates the product of the "0.5 minutes per sheet" and "240 sheets" (0.5×240), to thereby obtain the expected processing time (120 minutes).

The expected working time and the expected processing time are different from each other. Specifically, the expected working time is the time expected by the responsible operator OP while the expected processing time is the time which is automatically calculated by the server 10. Further, the expected working time also includes the time other than that for the printing of the print order while the expected processing time does not include the time other than that for the printing of the print order. Therefore, the expected working time is usually larger than the expected processing time.

As the "Expected Working Time Per Day", a value obtained by dividing the expected working time by the number of days left is recorded.

As the "Expected Processing Time Per Day", a value obtained by dividing the expected processing time by the number of days left is recorded.

As shown in FIG. 11, on the "job ID (101) in the job management database TB1, "Yamada" is recorded as the "Responsible Operator" and "No. 1" is recorded as the "Processing Printer". "July 22" is recorded as the "Deadline" and "3 days" is recorded as the "Number of Days Left". Further, "210 mins" is recorded as the "Expected Working Time" and "70 mins" obtained by dividing the expected working time of "210 mins" by the number of days left "3 days" is recorded as the "Expected Working Time Per Day". "120 mins" is recorded as the "Expected Processing Time" and "40 mins" obtained by dividing the expected processing time of "120 mins" by the number of days left "3 days" is recorded as the "Expected Processing Time Per Day".

Thus, the job management database TB1 is a data table for managing a printing job (also referred to as a job to be performed) which is scheduled to be performed by each operator, in other words, a printing job (also referred to as an assigned job) which has been assigned to each operator.

<Operation>

Hereinafter, discussion will be made on an overall operation of the second preferred embodiment, with reference to FIG. 10.

As shown in FIG. 10, the print order receiving part 11 receives print order data DT (DT1, DT2, or DT3) from the orderer terminal 70 (70a, 70b, or 70e) via the network NW. After the print order data DT is received, first, the combination determination part 13 determines a responsible operator OP to be in charge of printing of a new print order ND, out of a plurality of operators, on the basis of the responsible history database DB1. After that, the combination determination part 13 determines a processing printer PT to be used by the responsible operator OP in the printing of the new print order ND, out of a plurality of printers, on the basis of the usage history database DB2. Thus, in the second preferred embodiment, the combination determination part 13 separately determines the responsible operator OP and the processing printer PT.

Further, in the second preferred embodiment, the combination determination part 13 determines the responsible operator OP in consideration of whether or not each operator can be in charge of the new print order ND at the point in time when the new print order ND is received. Specifically, the combination determination part 13 determines one of operators who can be in charge of printing of the new print order ND at the point in time when the new print order ND is received, who has the largest number of last-fiscal-year responsible printing operations on the print orders from the orderer of the new print order ND, as a responsible operator OP. In detail, operators who have enough spare time till the deadline of the new print order ND to satisfy a predetermined standard are determined to be the operators who can be in charge of printing of the new print order ND on the basis of the job management database TB1 (see FIG. 11). In more detail, operators who have a busy rate BA1 (discussed later) lower than 1 are determined to be the operators who have enough spare time till the deadline of the new print order ND to satisfy the predetermined standard. Then, one of the operators who have enough spare time till the deadline of the new print order ND to satisfy the predetermined standard, who has the largest number of last-fiscal-year responsible printing operations for the orderer of the new print order ND, is determined as the responsible operator OP.

Furthermore, the combination determination part 13 determines the processing printer PT in consideration of whether or not each printer can be used for printing at the point in time when the new print order ND is received. Specifically, the combination determination part 13 determines one of printers which can be used to perform printing of the new print order ND at the point in time when the new print order ND is received, which has the largest number of last-fiscal-year uses by the responsible operator OP, as a processing printer PT. In detail, printers which have enough spare time till the deadline of the new print order ND to satisfy a predetermined standard are determined to be the printers which can be used to perform printing of the new print order ND on the basis of the job management database TB1 (see FIG. 11). In more detail, printers which have a busy rate BA2 (discussed later) lower than 1 are determined to be the printers which have enough spare time till the deadline of the new print order ND to satisfy the predetermined standard. Then, one of the printers which have enough spare time till the deadline of the new print order ND to satisfy the predetermined standard, which has the largest number of last-fiscal-year uses by the responsible operator OP, is determined as the processing printer PT.

Figure 12:
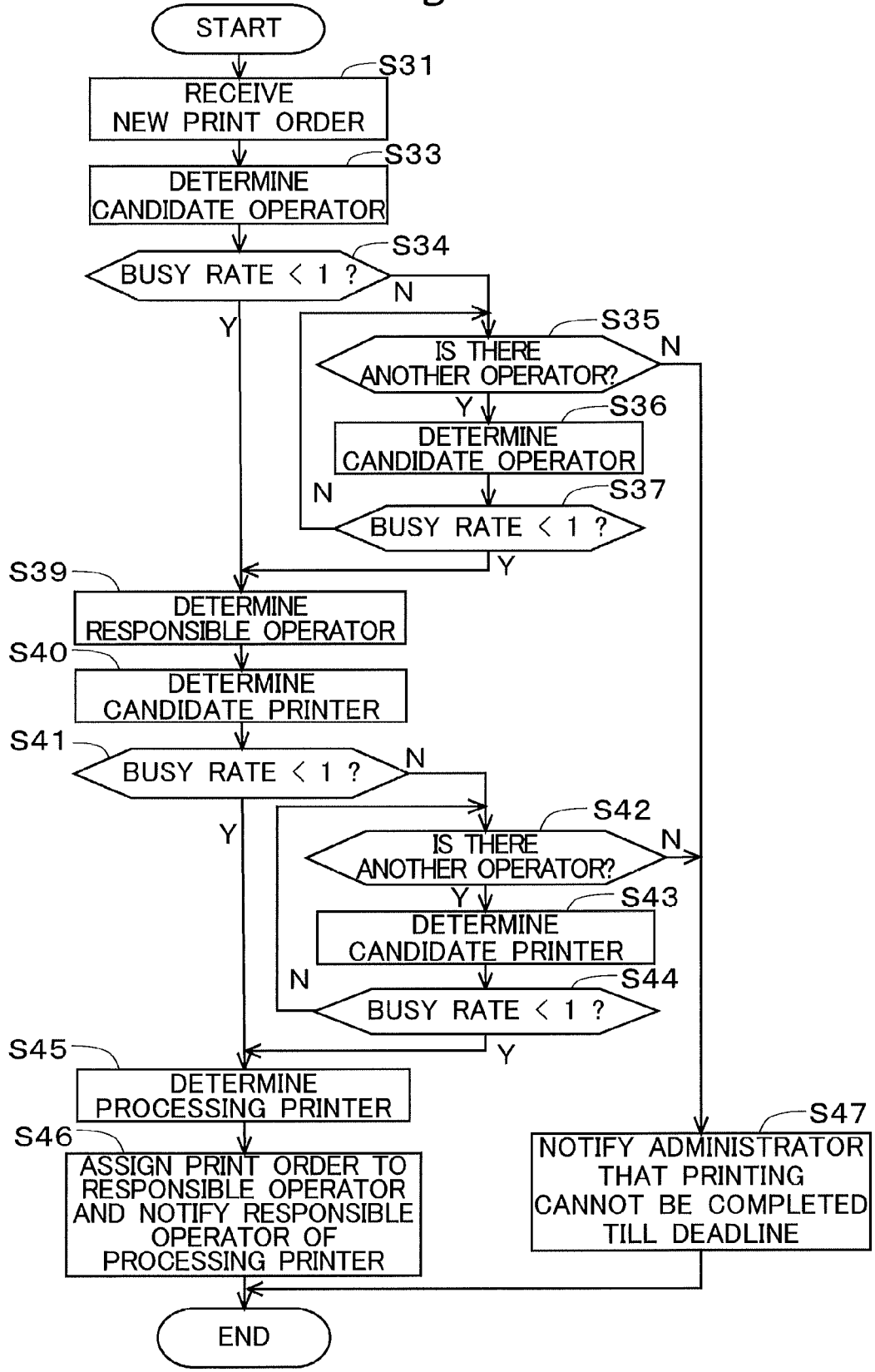
FIG. 12 is a flowchart showing an operation in accordance with the second preferred embodiment.

FIG. 12 is a flowchart showing an operation of the server 10 in accordance with the second preferred embodiment. Hereinafter, discussion will be made, with reference to FIG. 12, on a case where (1) a process of receiving an order, (2) a process of determining a responsible operator OP, (3) a process of determining a processing printer PT, and (4) an assigning process are sequentially performed.

(1) In Step S31, the server 10 receives a new print order ND on the basis of various information included in print order data DT. Specifically, the print order receiving part 11 receives the print order data DT (DT1, DT2, or DT3) from the orderer terminal 70 (70a, 70b, or 70c) via the network NW. Further, the print order receiving part 11 checks an orderer (UA, UB, and UC) of the new print order ND, a print setting ("monochrome printing" or "color printing"), and a deadline (date) on the basis of the "orderer information", the "print setting information", and "deadline information", respectively. Further, the print order receiving part 11 records various information on the new print order ND into the job management database TB1 (see FIG. 11).

(2) In the next Step S33, the combination determination part 13 determines a candidate operator CT1 who is a candidate for responsible operator OP of the new print order ND on the basis of the responsible history database DB1 (see FIG. 3). Specifically, the combination determination part 13 determines an operator who has the largest number of last-fiscal-year responsible printing operations on the print orders from the orderer of the new print order ND as the candidate operator CT1. When a new print order ND on the monochrome print setting is received from the orderer UA, for example, the combination determination part 13 determines the operator "Yamada" who has the largest number of last-fiscal-year responsible printing operations on the print orders from the orderer UA out of a plurality of operators as the candidate operator CT1 on the basis of the responsible history database DB1.

In Step S34, it is determined whether or not the busy rate BA1 (a value used for determining whether or not the candidate operator CT1 can be in charge of the new print order ND) (discussed later) of the candidate operator CT1 is lower than 1. When the busy rate BA1 is lower than 1, it is determined that the candidate operator CT1 can be in charge of the new print order ND, and the process goes to Step S39. Then, in Step S39, the combination determination part 13 determines the candidate operator CT1 as the responsible operator OP. On the other hand, when the busy rate BA1 is not lower than 1, it is determined that the candidate operator CT1 cannot be in charge of the new print order ND, and the process goes to Step S35. Operations of Step S35 and the following steps will be discussed later.

Herein, the busy rate BA1 is an availability factor of an object operator (candidate operator CT1) for a predetermined period PM from a reference point in time (e.g., the point in time when the new print order ND is received) to the deadline of the new print order ND, and expressed by Eq. (1) using a value α and a value β.

$$BA1=\alpha/\beta \quad (1)$$

The value α is a total value (also referred to as an expected working time) of working time (expected time) required to perform printing of the print orders (already-existing object jobs) to be completed within the predetermined period PM till the deadline of the new print order ND out of a plurality of print orders (a plurality of already-existing jobs) which have been assigned to the object operator. In short, the value α is the working time required of a specific operator to perform the already-existing object jobs.

The value β is a total value of time periods while the object operator can perform works within the predetermined period PM. In short, the value β is workable time of the specific operator.

Hereinafter, as an example of calculation of the busy rate BA1, discussion will be made on a case where a new print order ND from the orderer UA is received and the operator "Yamada" is determined as the candidate operator CT1. The order received date of the new print order ND is July 20 and the deadline of the new print order ND is July 22.

FIG. 13 is a view showing the expected working time per day for each of the print orders assigned to the candidate operator CT1 ("Yamada"). As shown in FIG. 13, the print orders (already-existing object jobs) to be completed till the deadline of July 22 are the job IDs (101, 102, and 104) except the job ID (103). Then, The expected working times of the job IDs (101, 102, and 104) from the order received date of July 20 to the deadline of July 22 are 210 minutes (70 minutes×3 days), 30 minutes (30 minutes×1 day), and 600 minutes (300 minutes×2 days), respectively. In other words, the expected working time (the working time required of the candidate operator CT1 to perform the already-existing object jobs) α for the print orders to be completed till the deadline of the new print order ND is 840 minutes (210 minutes+30 minutes+600 minutes). The deadline of the job ID (103), July 24, is two days after the deadline of the new print order ND, July 22. For this reason, the work for the job ID (103) may be performed after the deadline of the new print order ND, July 22. Therefore, the job ID (103) is not included in the print orders to be completed till the deadline of July 22.

The workable time β till the deadline of the new print order ND is time obtained by subtracting the time period while the work for the print orders cannot be performed (for example, time for other tasks) from the duty hours, and herein is assumed to be 90% of the duty hours. From the order received date of July 20 to the deadline of July 22, the working days are 3 days and the duty hours per day in the printing company CP are 7 hours. Therefore, the total duty hours till the deadline of the new print order ND are 1260 minutes (21 hours=3 days×7 hours), and the workable time 13 till the deadline of the new print order ND is 90% of the duty hours 1260 minutes, i.e., 1134 minutes (1260×0.9).

Then, by substituting the expected working time of 840 minutes required to complete the jobs till the deadline of the new print order ND and the workable time of 1134 minutes till the deadline of the new print order ND into Eq. (1), the busy rate BA1 (=0.74=840/1134) is obtained. In this case, since the busy rate BA1 (=0.74) is lower than 1, it is determined that the candidate operator CT1 ("Yamada") can be in charge of the new print order ND.

Thus, the busy rate BA1 is calculated on the basis of the value α (the working time required of the object operator to perform the already-existing object jobs) and the value β (the workable time of the object operator). Then, when the busy rate BA1 is lower than 1, it is determined that the object operator can be in charge of the new print order ND, and when the busy rate BA1 is not lower than 1, it is determined that the object operator cannot be in charge of the new print order ND.

That the busy rate BA1 is lower than 1 (α/β<1) means that the value β (the workable time of the object operator) is larger than the value α (the working time required of the object operator to perform the already-existing object jobs) (β−α>0). In short, that the busy rate BA1 is lower than 1 means that the object operator has spare time till the deadline of the new print order ND. In other words, in the above Step S34, by determining whether or not the busy rate BA1 is lower than 1, it is determined whether or not the object operator (candidate operator CT1) has spare time till the deadline of the new print order ND. Then, when the busy rate BA1 is lower than 1, it is determined that the object operator has spare time till the deadline of the new print order ND (in other words, the object operator can in charge of the new print order ND), and the process goes to Step S39. On the other hand, when the busy rate BA1 is not lower than 1, it is determined that the object operator does not have spare time till the deadline of the new print order ND (in other words, the object operator cannot in charge of the new print order ND), and the process goes to Step S35.

In Step S35 of FIG. 12, it is determined whether or not there is any operator other than the candidate operator CT1. When it is determined that there is an operator other than the candidate operator CT1, the process goes to Step S36, and when it is determined that there is not any operator other than the candidate operator CT1, the process goes to Step S47.

In Step S36, the combination determination part 13 determines an operator (also referred to as a second-place operator) who has the second largest number of last-fiscal-year responsible printing operations, next to the candidate operator CT1, as a candidate operator CT2.

As shown in FIG. 3, the operator who has the second largest number of last-fiscal-year responsible printing operations for the print orders on the monochrome print setting from the orderer UA, next to the candidate operator CT1 ("Yamada"), is "Yoshida". If the process goes to Step S36, the combination determination part 13 determines the operator "Yoshida" as the candidate operator CT2 ("Yoshida").

In Step S37, it is determined whether or not the busy rate BA1 of the candidate operator CT2 is lower than 1. When the busy rate BA1 is lower than 1, it is determined that the candidate operator CT2 can be in charge of the new print order ND, and the process goes to Step S39. Then, in Step S39, the combination determination part 13 determines the candidate operator CT2 as the responsible operator OP. On the other hand, when the busy rate BA1 is not lower than 1, it is determined that the candidate operator CT2 cannot be in charge of the new print order ND, and the process goes back to Step S35. In Step S35, it is determined whether or not there is any operator other than the candidate operator CT1 or CT2, and the same operation as discussed above is performed.

After that, in Step S47, the server 10 uses the notification part 15 to notify an administrator SU that the new print order ND cannot be completed till the deadline, by using E-mail or the like.

Thus, in Steps S33 to S39, the responsible operator OP is determined. In detail, one (e.g., "Yamada") of the operators who have spare time till the deadline of the new print order ND which is determined to satisfy a predetermined standard, who has the largest number of responsible printing operations for a specific orderer (e.g., the orderer UA), is determined as the responsible operator OP on the basis of the job management database.

(3) In Step S40, the combination determination part 13 determines a candidate printer CS1 which is a candidate for processing printer PT to be used by the responsible operator OP in the printing of the new print order ND, out of a plurality of printers, on the basis of the usage history database DB2 (see FIG. 4). It is assumed, for example, that the operator "Yamada" is determined as the responsible operator OP for the print order of monochrome printing. In this case, the combination determination part 13 determines the printer "No. 1" which has the largest number of uses by the responsible operator OP, out of a plurality of printers "No. 1" and "No. 2" for the monochrome print setting, as the candidate printer CS1 on the basis of the usage history database DB2.

In Step S41, it is determined whether or not the busy rate BA2 (a value used for determining whether or not the candidate printer CS1 can be used for printing of the new print order ND) (discussed later) of the candidate printer CS1 is lower than 1. When the busy rate BA2 is lower than 1, it is determined that the candidate printer CS1 can be used for printing of the new print order ND, and the process goes to Step S45. Then, in Step S45, the combination determination part 13 determines the candidate printer CS1 as the processing printer PT. On the other hand, when the busy rate BA2 is not lower than 1, it is determined that the candidate printer CS1 cannot be used for printing of the new print order ND, and the process goes to Step S42. Operations of Step S42 and the following steps will be discussed later.

Herein, the busy rate BA2 is an availability factor of an object printer (candidate printer CS1) for the predetermined period PM from the reference point in time (e.g., the point in time when the new print order ND is received) to the deadline of the new print order ND, and expressed by Eq. (2) using a value γ and a value σ.

$$BA2 = \gamma/\sigma \quad (2)$$

The value γ is a total value (also referred to as an expected processing time) of processing time (expected time) required to perform printing of the print orders (already-existing object jobs) to be completed within the predetermined period PM till the deadline of the new print order ND out of a plurality of print orders (a plurality of already-existing jobs) which have been assigned to the object printer. In short, the value γ is the processing time required of a specific printer to perform the already-existing object jobs.

The value σ is a total value of time periods while the object printer can perform processing within the predetermined period PM. In short, the value σ is processable time of the specific printer.

Hereinafter, as an example of calculation of the busy rate BA2, discussion will be made on a case where a new print order ND from the orderer UA is received and the printer "No. 1" is determined as the candidate printer CS1. The order received date of the new print order ND is July 20 and the deadline of the new print order ND is July 22.

FIG. 14 is a view showing the expected processing time per day for each of the print orders assigned to the candidate printer CS1 ("No. 1"). As shown in FIG. 14, the print order (already-existing object job) to be completed till the deadline of July 22 is the job ID (101). Then, the expected processing time of the job ID (101) from the order received date of July 20 to the deadline of July 22 is 120 minutes (40 minutes×3 days). In other words, the expected processing time (the processing time required of the candidate printer CS1 to perform the already-existing object job) γ for the print order to be completed till the deadline of the new print order ND is 120 minutes. The job ID (103) is not included in the print order to be completed till the deadline of July 22.

The processable time σ till the deadline of the new print order ND is time obtained by subtracting the time period while the printing for the print order cannot be performed (for example, time for the print setting) from the duty hours, and herein is assumed to be 90% of the duty hours. From the order received date of July 20 to the deadline of July 22, the working days are 3 days and the duty hours per day in the printing company CP are 7 hours. Therefore, the total duty hours till the deadline of the new print order ND are 1260 minutes (21 hours=3 days×7 hours), and the processable time σ till the deadline of the new print order ND is 90% of the duty hours 1260 minutes, i.e., 1134 minutes (1260×0.9).

Then, by substituting the expected processing time of 120 minutes required to complete the job till the deadline of the new print order ND and the processable time of 1134 minutes till the deadline of the new print order ND into Eq. (2), the busy rate BA2 (=0.11=120/1134) is obtained. In this case, since the busy rate BA2 (=0.11) is lower than 1, it is determined that the candidate printer CS1 ("No. 1") can be used for printing of the new print order ND.

Thus, the busy rate BA2 is calculated on the basis of the value γ (the processing time required of the object printer to perform the already-existing object job) and the value a (the processable time of the object printer). Then, when the busy rate BA2 is lower than 1, it is determined that the object printer can be used for printing of the new print order ND, and when the busy rate BA2 is not lower than 1, it is determined that the object printer cannot be used for printing of the new print order ND.

That the busy rate BA2 is lower than 1 (γ/σ<1) means that the value σ (the processable time of the object printer) is larger than the value γ (the processing time required of the object printer to perform the already-existing object job) (σ−γ>0). In short, that the busy rate BA2 is lower than 1 means that the object printer has spare time till the deadline of the new print order ND. In other words, in the above Step S41, by determining whether or not the busy rate BA2 is lower than 1, it is determined whether or not the object printer (candidate printer CS1) has spare time till the deadline of the new print order ND. Then, when the busy rate BA2 is lower than 1, it is determined that the object printer has spare time till the deadline of the new print order ND (in other words, the object printer can be used for printing of the new print order ND), and the process goes to Step S45. On the other hand, when the busy rate BA2 is not lower than 1, it is determined that the object printer does not have spare time till the deadline of the new print order ND (in other words, the object printer cannot be used for printing of the new print order ND), and the process goes to Step S42.

In Step S42 of FIG. 12, it is determined whether or not there is any printer other than the candidate printer CS1. When it is determined that there is a printer other than the candidate printer CS1, the process goes to Step S43, and when it is determined that there is not any printer other than the candidate printer CS1, the process goes to Step S47. Further, in Step S47, the above-discussed operation is performed.

In Step S43, the combination determination part 13 determines a printer (also referred to as a second-place printer) which has the second largest number of last-fiscal-year uses, next to the candidate printer CS1, as a candidate printer CS2.

In (2) the process of determining a responsible operator OP, for example, the operator "Yamada" is determined as the responsible operator OP for the print order on the monochrome print setting. In such a case, as shown in FIG. 4, a printer which has the second largest number of last-fiscal-year uses by the operator "Yamada", next to the candidate printer CS1 ("No. 1") is the printer "No. 2". If the process goes to Step S43, the combination determination part 13 determines the printer "No. 2" as the candidate printer CS2.

In Step S44, it is determined whether or not the busy rate BA2 of the candidate printer CS2 is lower than 1. When the busy rate BA2 is lower than 1, it is determined that the candidate printer CS2 can be used for printing of the new print order ND, and the process goes to Step S45. Then, in Step S45, the combination determination part 13 determines the candidate printer CS2 as the processing printer PT. On the other hand, when the busy rate BA2 is not lower than 1, it is determined that the candidate printer CS2 cannot be used for printing of the new print order ND, and the process goes back to Step S42. In Step S42, it is determined whether or not there is any printer other than the candidate printer CS1 or CS2, and the same operation as discussed above is performed.

Thus, in Steps S40 to S45, the processing printer PT is determined. In detail, one (e.g., "No. 1") of the printers who have spare time till the deadline of the new print order ND which is determined to satisfy a predetermined standard, which has the largest number of uses by the responsible operator OP (e.g., "Yamada"), is determined as the processing printer PT on the basis of the job management database.

(4) In the next Step S46, the notification part 15 notifies the responsible operator OP that the new print order ND is assigned to the responsible operator OP, and of the processing printer PT to be used in the printing of the new print order ND.

In the above operation, since the responsible operator OP to be in charge of the printing of the new print order on the basis of the responsible history database DB1, it is possible to reflect the preference of the orderer for the work result of each operator in determining the responsible operator OP. In other words, in determining the responsible operator OP, it is possible to consider the chemistry between the orderer of the new print order ND and each operator.

Further, one of the operators who have spare time till the deadline of the new print order ND which is determined to satisfy the predetermined standard (who have a busy rate BA1 lower than 1), who has the largest number of last-fiscal-year responsible printing operations on the print orders from the orderer of the new print order ND, is determined as the responsible operator OP. Therefore, it is possible to inhibit any operators who cannot meet the deadline of the new print order ND from being determined as the responsible operator OP.

When there is no operator who has spare time till the deadline of the new print order ND which is determined to satisfy the predetermined standard, the administrator SU of the printing system 100B is notified that the new print order ND cannot be completed till the deadline of the new print order ND. For this reason, the administrator SU can take any new measures on the new print order ND (asking the orderer to postpone the deadline, turning down the new print order ND, or the like).

Further, since the processing printer PT to be used by the responsible operator OP in the printing of the new print order ND is determined on the basis of the usage history database DB2, it is possible to consider the level of proficiency of the responsible operator OP for each printer. In other words, it is possible to select a printer with which the responsible operator OP is familiar, as the processing printer PT.

One of the printers which have spare time till the deadline of the new print order ND which is determined to satisfy the predetermined standard (which have a busy rate BA2 lower than 1), which has the largest number of last-fiscal-year uses by the responsible operator OP, is determined as the processing printer PT. Therefore, it is possible to inhibit any printers which cannot meet the deadline of the new print order ND from being determined as the processing printer PT.

When there is no printer which has spare time till the deadline of the new print order ND which is determined to satisfy the predetermined standard, the administrator SU of the printing system 100B is notified that the new print order ND cannot be completed till the deadline of the new print order ND. For this reason, the administrator SU can take any new measures on the new print order ND (asking the orderer to postpone the deadline, turning down the new print order ND, or the like).

3. Variations

Though the preferred embodiments of the present invention have been discussed above, the present invention is not limited to the above-discussed cases.

Though the case where the number of last-fiscal-year responsible printing operations is recorded into the responsible history database DB1 as the responsible history has been discussed in the above-discussed preferred embodiments, for example, this is only one exemplary case, and the number of responsible printing operations during a longer period (e.g., two years of the last fiscal year and the fiscal year before last) or the number of responsible printing operations during a shorter period (half a year in the second half of the last fiscal year) may be recorded. Thus, the number of responsible printing operations during a predetermined period (e.g., the latest year, the latest half a year, or the like) other than the last fiscal year may be recorded into the responsible history database DB1.

Further, though the case where the number of last-fiscal-year uses is recorded into the usage history database DB2 as the usage history has been discussed in the above-discussed preferred embodiments, this is only one exemplary case, and the number of uses during a longer period (e.g., two years of the last fiscal year and the fiscal year before last) or the number of uses during a shorter period (half a year in the second half of the last fiscal year) may be recorded. Thus, the number of uses during a predetermined period (e.g., the latest year, the latest half a year, or the like) other than the last fiscal year may be recorded into the usage history database DB2.

Though the case where the responsible operator OP is determined without consideration of whether or not each operator can be in charge of the new print order and the processing printer PT is determined without consideration of whether or not each printer can be used for printing has been discussed in the above-discussed first preferred embodiment, this is only one exemplary case. Like in the second preferred embodiment, for example, the responsible operator OP may be determined in consideration of whether or not each operator can be in charge of the new print order and the processing printer PT may be determined in consideration of whether or not each printer can be used for printing. Specifically, the combination determination part 13 obtains one of the combinations of the operators having a busy rate BA1 lower than 1 and the printers having a busy rate BA2 lower than 1, which has the highest evaluation index EB, to thereby determine the responsible operator OP to be in charge of the new print order ND and the processing printer PT to be used for the new print order ND.

Hereinafter, specific discussion will be made on such variations.

It is assumed, for example, that the print order receiving part 11 receives a new print order ND on the monochrome print setting from the orderer UA. In this case, the combination determination part 13 determines the responsible operator OP and the processing printer PT on the basis of the evaluation index database DB3a shown in FIG. 5.

In detail, the combination determination part 13 first obtains the combination CB11 ("Yamada", "No. 1") having the highest evaluation index EB11 (200). Then, the combination determination part 13 determines whether or not the busy rate BA1 of the operator "Yamada" of the combination CB11 and the busy rate BA2 of the printer "No. 1" thereof are each lower than 1. When it is determined that the busy rates are each lower than 1, the combination determination part 13 determines the operator "Yamada" of the combination CB11 and the printer "No. 1" thereof as the responsible operator OP and the processing printer PT, respectively. On the other hand, when it is determined that at least one of the busy rates is not lower than 1, the combination determination part 13 obtains the combination CB12 ("Yamada", "No. 2") having the second highest evaluation index EB12 (195). Then, the combination determination part 13 determines whether or not the busy rate BA1 of the operator "Yamada" of the combination CB12 and the busy rate BA2 of the printer "No. 2" thereof are each lower than 1. When it is determined that the busy rates are each lower than 1, the combination determination part 13 determines the operator "Yamada" of the combination CB12 and the printer "No. 2" thereof as the responsible operator OP and the processing printer PT, respectively. On the other hand, when it is determined that at least one of the busy rates is not lower than 1, the combination determination part 13 obtains the combination CB16 ("Yoshida", "No. 2") having the next (third) highest evaluation index EB16 (160). Thus, the combination determination part 13 determines whether or not the busy rate BA1 of the operator and the busy rate BA2 of the printer are each lower than 1 sequentially on the combinations CB from the one having the highest evaluation index EB. Then, the combination determination part 13 determines the operator and the printer of a combination CB which have respective busy rates which are first determined to be each lower than 1, as the responsible operator OP and the processing printer PT, respectively.

Though the case where it is determined whether or not each operator can be in charge of the new print order ND by using the condition that the busy rate BA1 thereof is lower than 1 has been discussed in the above-discussed second preferred embodiment, this is only one exemplary case, and another condition that the busy rate BA1 is lower than a value (e.g., "0.8" or the like) smaller than 1 may be used, to determine whether or not each operator can be in charge of the new print order ND. It is thereby possible to further inhibit any operators who cannot meet the deadline of the new print order ND from being determined as the responsible operator OP, as compared with the case where it is determined whether or not each operator can be in charge of the new print order ND by using the condition that the busy rate BA1 thereof is lower than 1.

Though the case where it is determined whether or not each printer can be used for printing of the new print order ND by using the condition that the busy rate BA2 thereof is lower than 1 has been discussed in the above-discussed second preferred embodiment, this is only one exemplary case, and another condition that the busy rate BA2 is lower than a value (e.g., "0.8" or the like) smaller than 1 may be used, to determine whether or not each printer can be used for printing of the new print order ND. It is thereby possible to further inhibit any printers which cannot meet the deadline of the new print order ND from being determined as the processing printer PT, as compared with the case where it is determined whether or not each printer can be used for printing of the new print order ND by using the condition that the busy rate BA2 thereof is lower than 1.

Further, though the case where the administrator SU is notified by using E-mail that the new print order ND cannot be completed till the deadline thereof in Step S47 of FIG. 12 has been discussed in the above-discussed second preferred embodiment, this is only one exemplary case, and any dedicated applications (e.g., "Messenger") other than the E-mail software may be used to notify the administrator SU.

Though the case where the number of responsible printing operations on the monochrome print setting and the number of responsible printing operations on the color print setting are separately recorded in the responsible history database DB1 has been discussed in the above-discussed preferred embodiments, this is only one exemplary case. Instead of separating the monochrome print setting and the color print setting, the number of responsible printing operations on both the monochrome print setting and the color print setting may be recorded in the responsible history database DB1.

While the invention has been shown and described in detail, the foregoing description is in all aspects illustrative and not restrictive. It is therefore understood that numerous modifications and variations can be devised without departing from the scope of the invention.

What is claimed is:

1. A printing system comprising:
a storage part for storing therein first history information indicating the number of printing operations of each operator ordered by each orderer, and second history information indicating the number of uses of each printer by each operator; and
a CPU for operating a determination part for obtaining an evaluation index database indicating respective evaluation indices for a plurality of combinations of operators and printers on the basis of said first history information and said second history information by orderer, and for determining a combination of printer and operator which has the highest evaluation index among said plurality of combinations on the basis of said evaluation index database for a specific orderer as a specific operator to be in charge of printing of a new print order from the specific orderer and a processing printer to be used by said specific operator in said printing of said new print order on the basis of said first history information and said second history information.

2. A printing system comprising:
a storage part for storing therein a charge history database corresponding to first history information indicating a number of printing operations of each operator ordered by each orderer, and a usage history database corresponding to second history information indicating a number of uses of each printer by each operator; and
a CPU for operating a determination part for determining a specific operator to be in charge of printing of a new print order from a specific orderer on the basis of said charge history database, the specific operator having the largest number of printing operations for the specific orderer and a specific processing printer to be used by said specific operator in said printing of said new print order on the basis of the usage history database, the specific processing printer having the largest number of uses by the specific operator.

3. The printing system according to claim 2, wherein
said storage part stores therein a responsible history database determining said first history information, a usage history database determining said second history information, and a job management database for managing a job to be performed by said each operator, and
said determination part determines one of operators having spare time till a deadline of said new print order which is determined to satisfy a predetermined standard, who has the largest number of responsible printing operations for said specific orderer, as said responsible operator on the basis of said job management database.

4. The printing system according to claim 2, wherein
said storage part stores therein a responsible history database determining said first history information, a usage history database determining said second history information, and a job management database for managing a job to be performed by said each operator, and
said determination part determines whether or not there is an operator who has spare time till a deadline of said new print order which is determined to satisfy a predetermined standard on the basis of said job management database,
said printing system further comprising:
a notification part for notifying an administrator of said printing system that a job for said new print order cannot be completed till said deadline if there is no operator who has spare time till said deadline of said new print order which is determined to satisfy said predetermined standard.

5. The printing system according to claim 2, wherein
said storage part stores therein a responsible history database determining said first history information, a usage history database determining said second history information, and a job management database for managing a job to be performed by said each operator, and
said determination part determines one of printers having spare time till a deadline of said new print order which is determined to satisfy a predetermined standard, which has the largest number of uses by said responsible operator, as said processing printer on the basis of said job management database.

6. The printing system according to claim 2, wherein
said storage part stores therein a responsible history database determining said first history information, a usage history database determining said second history information, and a job management database for managing a job to be performed by said each operator, and
said determination part determines whether or not there is a printer which has spare time till a deadline of said new print order which is determined to satisfy a predetermined standard on the basis of said job management database,
said printing system further comprising:
a notification part for notifying an administrator of said printing system that a job for said new print order cannot be completed till said deadline if there is no printer which has spare time till said deadline of said new print order which is determined to satisfy said predetermined standard.

7. A non-transitory computer-readable recording medium recording therein a computer program for causing a computer to serve as a device comprising:
a storage part for storing therein first history information indicating the number of printing operations of each operator ordered by each orderer, and second history information indicating the number of uses of each printer by each operator; and
a determination part for obtaining an evaluation index database indicating respective evaluation indices for a plurality of combinations of operators and printers on the basis of said first history information and said second history information by orderer, and for determining a combination of printer and operator which has the highest evaluation index among said plurality of combinations on the basis of said evaluation index database for a specific orderer as a specific operator to be in charge of printing of a new print order from the specific orderer and a processing printer to be used by said specific operator in said printing of said new print order on the basis of said first history information and said second history information.

8. A non-transitory computer-readable recording medium recording therein a computer program for causing a computer to serve as a device comprising:
- a storage part for storing therein a charge history database corresponding to first history information indicating a number of printing operations of each operator ordered by each orderer, and a usage history database corresponding to second history information indicating a number of uses of each printer by each operator; and
- a determination part for determining a specific operator to be in charge of printing of a new print order from a specific orderer on the basis of said charge history database, the specific operator having the largest number of printing operations for the specific orderer and a specific processing printer to be used by said specific operator in said printing of said new print order on the basis of the usage history database, the specific processing printer having the largest number of uses by the specific operator.

* * * * *